United States Patent
Baines

(10) Patent No.: US 6,700,290 B1
(45) Date of Patent: *Mar. 2, 2004

(54) BRUSH ASSEMBLY WITH AXIALLY SPACED BRUSH ARMS WHICH HAVE DIFFERENT RESONANT FREQUENCIES

(75) Inventor: Roger Frederick Baines, Trumbull, CT (US)

(73) Assignee: Johnson Electric S.A., Le Chaux de Fonds (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/702,615

(22) Filed: May 17, 1991

(51) Int. Cl.$^7$ .................. H02K 13/00; H01R 39/24
(52) U.S. Cl. .................. 310/239; 310/244; 310/248
(58) Field of Search .................. 310/239, 244, 310/246, 248, 51

(56) References Cited

U.S. PATENT DOCUMENTS

| | | | | |
|---|---|---|---|---|
| 421,967 A | * | 2/1890 | Pfatscher | 310/239 |
| 2,760,094 A | * | 8/1956 | Edmunson | 310/239 |
| 3,041,118 A | * | 6/1962 | Campbell | 310/244 |
| 3,141,985 A | * | 7/1964 | Martin | 310/239 |
| 3,171,997 A | * | 3/1965 | Hammer | 310/239 UX |
| 3,619,677 A | * | 11/1971 | Hargreaves | 310/239 |
| 3,671,791 A | * | 6/1972 | Muller | 310/239 UK |
| 4,037,125 A | * | 7/1977 | Aoki | 310/248 |
| 4,086,510 A | * | 4/1978 | Watanabe | 310/242 |
| 4,163,916 A | * | 8/1979 | Kobayashi | 310/246 |
| 4,195,242 A | * | 3/1980 | Mabuchi | 310/239 |
| 4,431,933 A | * | 2/1984 | Mabuchi | 310/239 |
| 4,705,978 A | * | 11/1987 | Mabuchi | 310/248 |
| 4,728,835 A | * | 3/1988 | Baines | 310/239 |
| 4,983,872 A | * | 1/1991 | Strobl | 310/239 |

FOREIGN PATENT DOCUMENTS

| | | | | |
|---|---|---|---|---|
| GB | 1111527 | * | 5/1968 | 310/239 |
| JP | 55-83851 | | 6/1980 | |
| JP | 59-30672 | | 2/1984 | |
| JP | 59-75748 | | 5/1984 | |
| JP | 59-230450 | | 12/1984 | |
| JP | 60-141663 | | 9/1985 | |
| JP | 62-293953 | * | 12/1987 | 310/239 |
| JP | 63-77457 | | 5/1988 | |

OTHER PUBLICATIONS

CRC Handbook of Chemistry and Physics, 62nd Edition, pp. B89 and B97, 1982.*
Translation of Japanese Office Action dated Sep. 8, 1998.

* cited by examiner

*Primary Examiner*—Karl Tamai
(74) *Attorney, Agent, or Firm*—Birch, Stewart, Kolasch & Birch, LLP

(57) ABSTRACT

An electric motor with brush assembly supporting two separately formed brushes. A fractional horsepower direct current motor has a brush assembly supporting two separately formed brushes and side by side and connected electrically in parallel. This reduces the effective current density required for each brush without increasing the size of the brushes required and affecting the dynamic behavior.

1 Claim, 3 Drawing Sheets

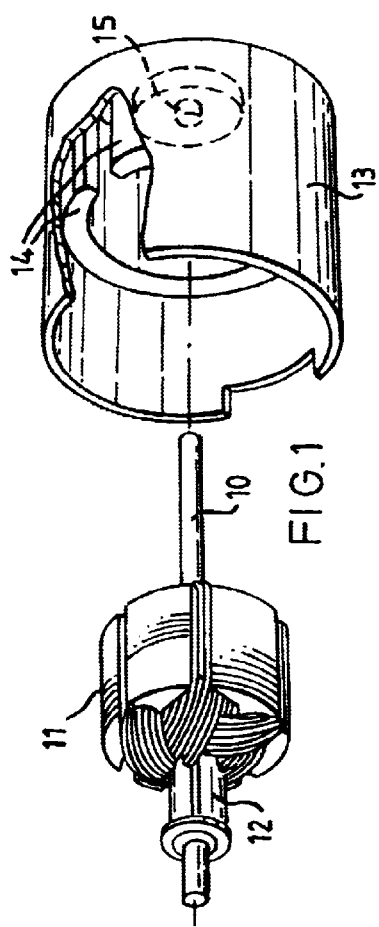
FIG.1
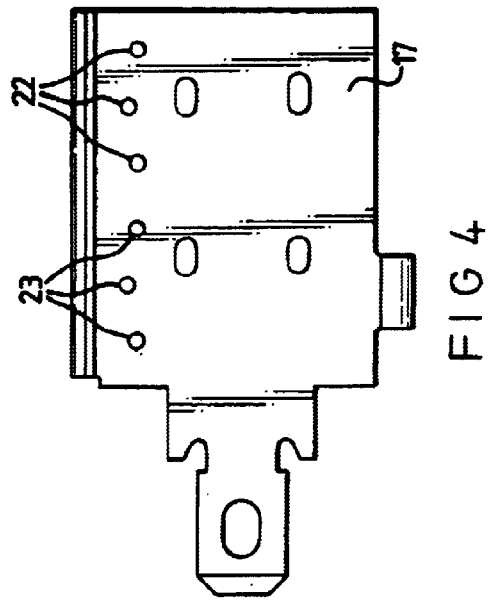
FIG.4
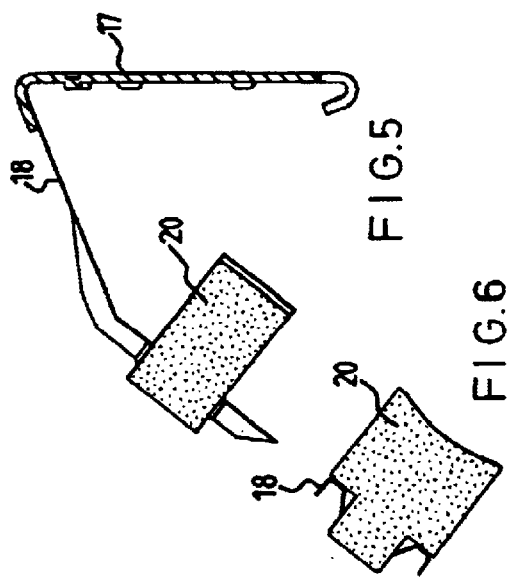
FIG.5
FIG.6

BRUSH ASSEMBLY WITH AXIALLY SPACED BRUSH ARMS WHICH HAVE DIFFERENT RESONANT FREQUENCIES

BACKGROUND OF THE INVENTION

The present invention relates to an electric motor and more particularly to brush gear for an electric motor.

Brush gear in small electric motors, particular fractional horsepower permanent magnet direct current (PMDC) motors, typically comprises a carbon brush which is carried on an end of a resilient, electrically conducting arm—the brushleaf. The brushleaf is arranged to bias the brush against a commutator on the motor shaft. Typically the brush gear is mounted in an end cap which carries a bearing for the motor shaft and forms a structural part of the motor assembly.

In low voltage applications, the total resistance of the motor becomes more and more determined by the interface resistance between the brushes and the commutator. As the motor resistance determines the maximum power range within which the motor can operate, reducing the brush/commutator interface resistance is very desirable.

BRIEF SUMMARY OF THE INVENTION

According to the invention there is provided an electric motor brush assembly comprising resilient electrically conductive support means arranged to carry two or more separately formed brush bodies axially displaced with respect to a longitudinal axis of the motor and connected electrically in parallel.

The support means normally comprises a separate arm for each brush body.

The separate arms may be arranged to have different natural resonance frequencies of oscillation.

The brush bodies may have different sizes and/or different physical densities.

A fractional horsepower direct current electric motor may be provided having a brush assembly comprising resilient electrically conductive support means arranged to carry two or more separately formed brush bodies axially displaced with respect to a longitudinal axis of the motor and connected electrically in parallel.

BRIEF DESCRIPTION OF THE DRAWINGS

A fractional horsepower direct current electric motor according to the invention will now be described by way of example with reference to the accompanying drawings in which:

FIG. 1 is an isometric, partly broken away view of the motor with an end cap removed;

FIG. 4 is a top view of the brush assembly;

FIG. 5 is a side view of the brush assembly; and

FIG. 6 shows a different view of part of the brush assembly of FIG. 5.

DETAILED DESCRIPTION OF PREFERRED EMBODIMENTS

Figure 3:
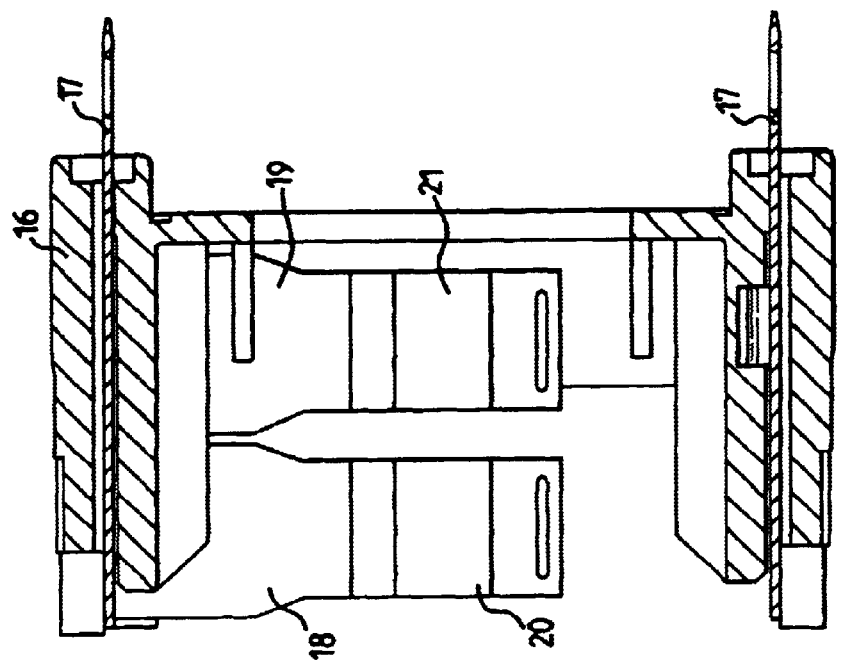
FIG. 3 is a sectioned side elevation of FIG. 2.

Referring to the drawings, in FIG. 1 the motor has a shaft 10 carrying a wound armature 11 and a circumferentially segmented commutator 12. The commutator 12 is axially longer than commutators of conventional motors of a similar size. A casing 13 has mounted therein two field magnets 14 and an end bearing 15 for supporting the shaft 10.

Figure 2:
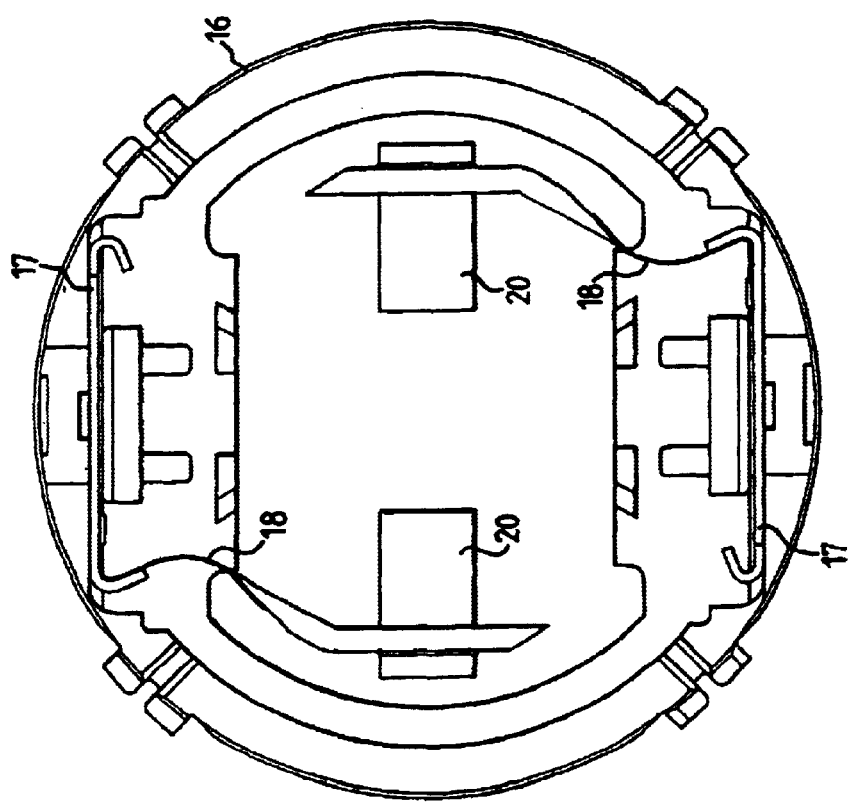
FIG. 2 is an end view of the inside of the end cap, showing a brush assembly.
Figure 3A:
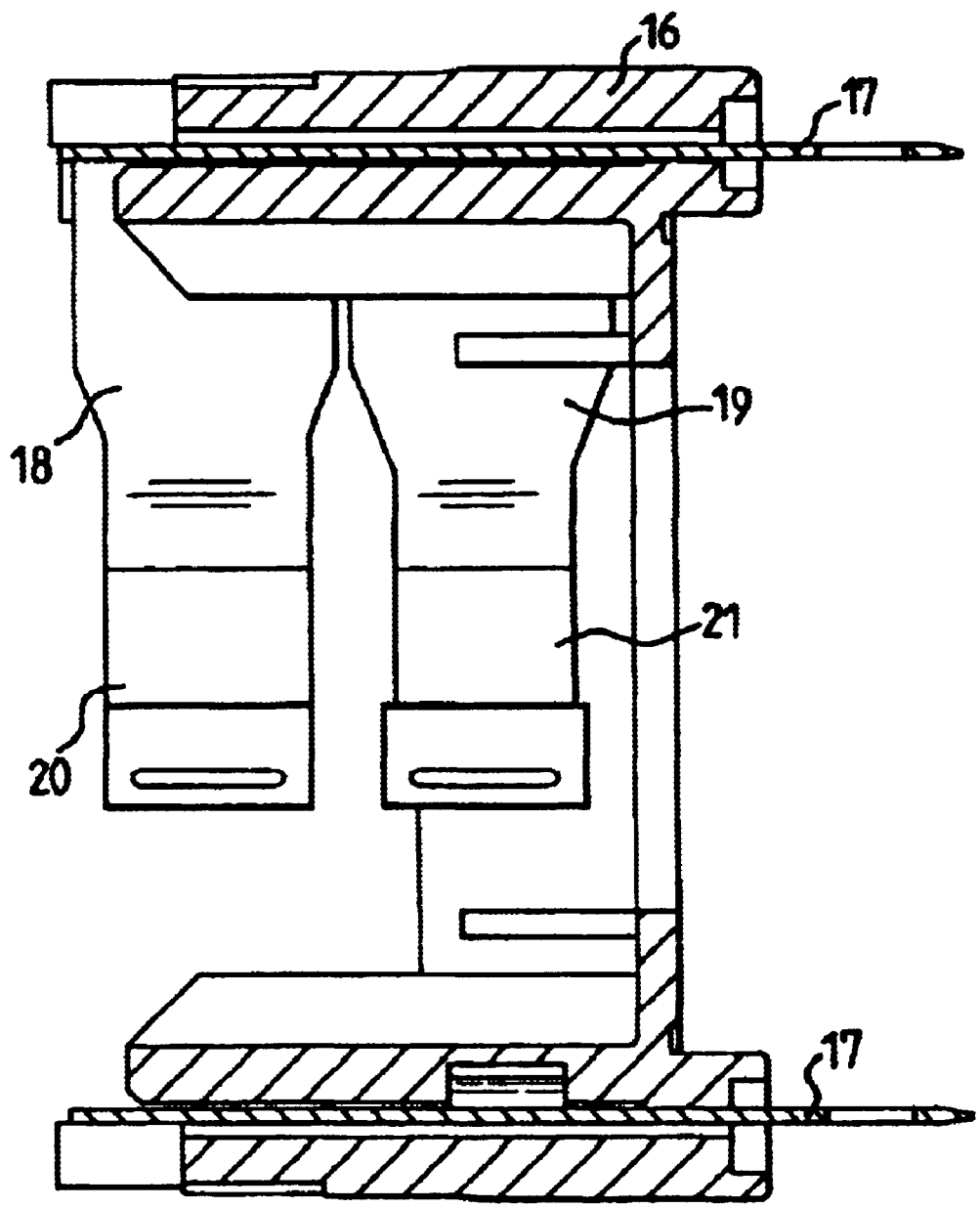
FIG. 3A shows the same view as FIG. 3; but with brushes of different sizes.

In FIGS. 2 and 3, a molded plastic end cap 16 provides a plastic brush holder which supports two pairs of brush arms. Each pair of brush arms consists of a terminal part 17 connected to resilient brush supporting parts or brush leaves 18 and 19. The supporting parts 18, 19 on the left side of FIG. 2 will be referred to as the first and second supporting parts and the supporting parts 18, 19 on the right side of FIG. 2 will be referred to as the third and fourth supporting parts. The brushes 20 and 21 will be referred to in a corresponding manner. Brushes 20 and 21 are axially displaced with respect to the longitudinal axis of the motor and are supported by the free end of respective brush leaves 18 and 19. The brushes are urged in use into contact with the commutator 12. In FIG. 3A the brushes 20 and 21 are of different sizes.

In FIGS. 3 and 4, the terminal part 17 and brush leaves 18 and 19 are fixed together by sets of rivots 22 and 23 respectively. Other forms of fixing can be used, such as a clip fixing. The tops of the brushes 20 and 21 are shaped (see FIG. 6) and are held by interference fits in elongated slots provided in and adjacent the free ends of the brush leaves 18 and 19 respectively.

Embodiments of the invention provide brush assemblies in which two brushes, or more if desired, are mounted side by side and connected electrically in parallel in use. This means that the motor can have a common design but be fitted or altered at the point of assembly to have one brush per brush assembly or two brushes connected in effect in parallel in each assembly. This allows for maximizing of common components for different capacity motors. Where the motor is required for higher power uses, two (or more) brushes are used in the form described in the embodiment. FIG. 3 shows brush leaves 18 and 19 having substantially equal lengths.

In modified embodiments, the brush leaves 18 and 19 are formed with different resilient material or somewhat different dimensions so that the respective natural frequencies of oscillations of the brush leaves are different. A slot aperture 24 for example may be formed in one of the brush leaves intermediate its ends to reduce its effective resilience. This means that whenever the motor shaft speed corresponds to the resonant frequency of one of the brush leaves, the brush supported by the other leaf will tend to remain in good contact with the commutator. Alternatively, or additionally, the brushes 20 and 21 may be of the same overall dimensions, so that they fit into the same sized elongate slots in the brush leaves, but are formed of different physical density brush material. The brushes may however be formed with different overall sizes for the same purposes and are preferably formed with top parts of the same dimensions to interference fit a common sized slot in the brush leaves.

As mentioned earlier, embodiments of the invention enable the effective interface resistance to be reduced, and allow high currents to be carried for the same winding resistance to provide higher stall torques and currents. As there are two or more brushes, the current density for each brush need not be increased to provide this. Higher current densities normally increase wear, and so reduce the operational lives of the brushes. Further, the dynamic behavior of each brush is different and can be made to be different as explained, so that over a range of speeds, sound brush contact is maintained without simply increasing brush contact pressure, which in turn would reduce the life of each brush. The inherent deterioration in dynamic behavior associated with enlarging brushes is also avoided. Dynamic performance is important because the commutators are invariably somewhat imperfect in roundness and rotate at very high speeds in use.

I claim:

1. An electric motor brush assembly for being mounted in a DC electric motor, consisting of:

first and second resilient, electrically conductive support arms, connected electrically in parallel, arranged for being axially spaced from each other with respect to a longitudinal axis of said DC electric motor when said assembly is mounted in the motor, third and fourth resilient, electrically conductive support arms, connected electrically in parallel, arranged for being axially spaced from each other with respect to a longitudinal axis of said DC electric motor when said assembly is mounted in the motor, each of said support arms carrying a respective carbon brush body, said carbon brush bodies being arranged for contacting a generally cylindrical commutator of the motor, each of said brush bodies being mounted by an interference fit in an aperture in a respective support arm, the commutator having a plurality of circumferential segments and the first and second brush bodies being capable of contacting a single one of said segments simultaneously and the third and fourth brushes assembly being capable of contacting a single one of said segments simultaneously when the assembly is mounted in the motor, an end cap, said support arms being mounted on said end cap, said brush bodies being mounted on said end cap via said support arms for contacting a commutator of the motor, each support arm in combination with a respective brush body having a different respective natural resonance frequency of oscillation, wherein said support arms have portions made of different resilient materials, thereby providing said different natural resonance frequencies, wherein said brush bodies having different resonance frequencies remain in reliable electrical contact with said commutator in order to reduce interface resistance between the brush bodies and the commutator, despite oscillations of said support arms and brush bodies which occur in response to rotation of said commutator.

* * * * *